UNITED STATES PATENT OFFICE.

SALO WOHLE, OF LONDON, ENGLAND.

DETERGENT FOR SCOURING WOOL.

No. 818,648.

Specification of Letters Patent.

Patented April 24, 1906.

Application filed June 1, 1905. Serial No. 263,321.

*To all whom it may concern:*

Be it known that I, SALO WOHLE, a subject of the German Emperor, residing in London, England, have invented certain new and useful Improvements in Detergents for Scouring Wool, of which the following is a specification.

In accordance with my invention a mucilaginous liquid, such as a decoction of linseed, is mixed with a fat or fatty oil, such as castor-oil, and with saponin, which may be added either as such or by digesting the decoction with the addition of soda, preferably carbonate of soda, with a material containing saponin, such as horse-chestnuts, acacias, or ritanuts. To the mixture thus made is added some hydrogen peroxid or materials which produce it, such as a vegetable acid or acid salt, and a suitable peroxid. For example, two and one-half pounds of linseed or three-fourths of a pound of other vegetable material yielding mucilage are boiled with five gallons of water and the decoction is strained and there is added an extract made by digesting twelve and one-half pounds of stripped horse-chestnuts with five gallons of water to which carbonate of soda has been added, or the linseed and horse-chestnuts may be digested together and the decoction strained. About one-half pound of a fatty oil, preferably castor-oil, is now added, followed by about one ounce of a feeble acid, such as acetic acid or an acid salt, like salts of lemon, and about one and one-fourth ounces of some suitable peroxid, (preferably in solution,) such as sodium peroxid. This liquid is now ready for use as a detergent for scouring wool or the like.

The above recipe is suitable for fine wools. Coarser varieties need more saponin than is obtainable from horse-chestnuts. For these, therefore, there may be added to the above mixture saponin from any source—say on the same scale of proportions, ten pounds.

The essential ingredients of the detergent are the mucilaginous vegetable matter and the saponin. A vegetable acid is advantageous, and the peroxid is useful in yielding hydrogen peroxid, which may of course be substituted for it.

By use of this detergent the wool grease is removed from the wool without being saponified and is therefore easily recovered. The wool is at the same time made more flexible than in the ordinary scouring processes and requires less oil in spinning. Moreover, the yolk remains in the wool, which is therefore of better weight.

Having now particularly described and ascertained the nature of my said invention and in what manner the same is to be performed, I declare that what I claim is—

1. A detergent for scouring wool made from a decoction of a vegetable material yielding mucilage, to which vegetable saponin is added, as well as small quantities of a fatty oil, a feeble vegetable acid, and peroxid of sodium.

2. A detergent for scouring wool, comprising a decoction of vegetable material yielding mucilage, an extract of stripped horse-chestnuts to which carbonate of soda has been added, a fatty oil, a feeble vegetable acid, and sodium peroxid, combined in or about the proportions specified.

In witness whereof I have hereunto set my hand in the presence of two witnesses.

SALO WOHLE.

Witnesses:
JOHN H. JACK,
THOS. GEO. BIRD.